(12) United States Patent
Raj et al.

(10) Patent No.: US 6,290,894 B1
(45) Date of Patent: Sep. 18, 2001

(54) FERROFLUID SCULPTING APPARATUS (75) Inventors: Kuldip Raj, Merrimack; John Lennon, Manchester, both of NH (US)

(73) Assignee: Ferrofluidics Corporation, Nashua, NH (US)

( * ) Notice: Subject to any disclaimer, the term of this patent is extended or adjusted under 35 U.S.C. 154(b) by 0 days.

(21) Appl. No.: 09/275,197

(22) Filed: Mar. 24, 1999

(51) Int. Cl.$^7$ ........................................ H05B 6/00
(52) U.S. Cl. ................................ 264/405; 264/427
(58) Field of Search .................. 264/405, 427; 335/284

(56) References Cited

U.S. PATENT DOCUMENTS

| | | | |
|---|---|---|---|
| 4,025,448 | * 5/1977 | Sudol ........................... | 252/60 |
| 5,916,641 | * 6/1999 | McArdle et al. ............... | 427/487 |

* cited by examiner

*Primary Examiner*—Ramon M. Barrera
(74) *Attorney, Agent, or Firm*—Kudirka & Jobse, LLP (57) ABSTRACT

Magnetic sculptures are formed by placing a ferrofluid in a shaped magnetic field. In response to the field, the ferrofluid forms fanciful sculptures as determined by the magnetic field lines. In one embodiment, a low viscosity and surface tension ferrofluid is used in a sealed housing to prevent the ferrofluid from evaporating. The housing is filled with a nonmagnetic liquid that is immiscible with the ferrofluid and contains a ferrofluid globule. In order to prevent the ferrofluid from wetting the inside surface of the housing and degrading the apparatus, the housing is comprised of a boro-silicate glass and the ferrofluid comprises a fluorocarbon carrier liquid. Magnetic sculptures can be formed by applying an external magnetic field of sufficient strength to the apparatus. In another embodiment, the aforementioned apparatus may contain a small permanent magnetic located within the ferrofluid globule. In still another alternative embodiment, magnetic sculptures are formed in the open air by using apparatus which comprises an object for receiving a ferrofluid and a mechanism for generating a magnetic field to shape the ferrofluid. The mechanism may include a magnet which generates shaped fields, a shaped magnet or a shaped magnetically permeable pole piece and a magnet. The ferrofluid is a hydrocarbon-based fluid that does not evaporate rapidly so that the sculpture is stable, but the viscosity of the ferrofluid is low enough that the ferrofluid forms intricate designs based on the magnetic field used to shape the ferrofluid. A wax ferrofluid can also be used to create artistic patterns by shaped magnetic fields in the same manner as standard ferrofluid. The advantage of wax is that it can be painted to enhance visual effects. No magnet is needed to maintain the shape of the sculpture after the wax solidifies.

4 Claims, 9 Drawing Sheets

FERROFLUID SCULPTING APPARATUS

FIELD OF THE INVENTION

This invention relates to a ferrofluid assembly and, more specifically, to an apparatus for producing novel magnetic sculptures for amusement and educational purposes.

BACKGROUND OF THE INVENTION

Magnetic materials have been used for amusement and educational purposes. For example, containers with magnetic materials have been used before to provide interesting designs based on the magnetic properties of the fluid. Magnetic gels have been designed that respond to a magnet, allowing a gel mass to be attracted and moved by a magnet "wand" for purposes of a demonstration. Two patents cover these different types of uses. The first patent is U.S. Pat. No. 3,648,269 entitled "Magnetic Fluid Display Device," incorporated herein by reference for all purposes. The second is U.S. Pat. No. 5,810,640 entitled "Magnetic Gel Toy and Method For Making."

U.S. Pat. No. 3,648,269 discloses a display device that includes an opaque magnetic ferrofluid and a transparent fluid immiscible with the ferrofluid within a sealed display housing. The display housing can be a cylindrical container or a flat, rectangular, "sandwich" type construction that is transparent for viewing. Different types of ferrofluids are disclosed and include water-based ferrofluids, hydrocarbons, fluorocarbons, and the like.

Unfortunately, the different types of ferrofluid materials disclosed in U.S. Pat. No. 3,648,269 suffer from several problems. One such problem is that the ferrofluid wets the surface of the display housing such that spots and smears form on the inside of the housing surface. The spotting mars the view of the display and eventually reduces the amount of free ferrofluid which forms the display. An additional problem is that the ferrofluid may degenerate over time such that its responsiveness to magnetic fields degrades compared to the initial state of relatively fresh ferrofluid. The combination of these two problems severely reduces the shelf-life of the display.

U.S. Pat. No. 5,810,640 discloses magnetic gel materials that are used as toys, play things, and novelties. Magnetic materials are mixed with a play gel that has a soft, thixotropic property to produce a magnetic gel. Using this gel, various types of play applications are possible. These play applications include resilient plastic covered forms, template action figure body forms, flowers, and volcanoes with various shaped openings. A magnetic tool or "wand" is utilized to attract the magnetic gel in a desired direction.

The magnetic gel disclosed in U.S. Pat. No. 5,810,640, suffers some of the same problems above, as well as other problems now presented. For example, by the very nature of the disclosed gel, the magnetic gel is much more viscous than the ferrofluid used in previous applications stated above. As such, the magnetic gel is slow to respond to a magnetic force and is too thick to allow a definition of a magnetic field to be imposed on it. Furthermore, since the gel is exposed to air, it can dry out over time and become hardened to the point of not responding to a magnetic field as intended.

Accordingly, what is needed is a new type of magnetic apparatus which allows free form sculptures or artistic patterns to be generated by magnetic fields. This magnetic apparatus uses a ferrofluid to form the sculpture. The ferrofluid should have a low enough viscosity that it is quickly shaped along the lines of magnetic force applied to it, it does not agglomerate when placed in a container over long periods of time, and it has great longevity and stability over prior systems.

SUMMARY OF THE INVENTION

In accordance with one embodiment, magnetic sculptures are formed by placing a ferrofluid in a shaped magnetic field. In response to the field, the ferrofluid forms fanciful sculptures and art forms as determined by the magnetic field lines. The magnetic field lines are evident by the formation of distinct spikes in the ferrofluid.

In one embodiment, a low viscosity ferrofluid is used in a sealed housing to prevent the ferrofluid from evaporating. The housing is filled with a nonmagnetic liquid that is immiscible with the ferrofluid and contains a ferrofluid globule. In order to prevent the ferrofluid from wetting the inside surface of the housing and degrading the apparatus, the housing is comprised of a boro-silicate glass and the ferrofluid comprises a fluorocarbon carrier liquid. Magnetic sculptures can be formed by applying an external magnetic field of sufficient strength to the apparatus so as to create the magnetic field lines of desired shape within the apparatus. The ferrofluid has a low viscosity, low surface tension and high enough magnetization that allows it to define sharp spikes pointing along the field line path of a magnetic field and, accordingly, the field lines are evident by the formation of a pattern of distinct spikes in the globule which together form a fanciful art form. The shape and size of the sculpture can be varied by changing the shape and strength of the applied magnetic field.

In another embodiment, the aforementioned apparatus may contain a small permanent magnetic located within the ferrofluid globule which magnet can move within the housing for generating an internal magnetic field. The ferrofluid globule encases the permanent magnet. The permanent magnet can interact with an externally applied magnetic field to form different sculptured forms depending on the orientation of the internal magnet with the external field.

In still another alternative embodiment, magnetic sculptures are formed in the open air by using an apparatus which comprises an object for receiving a ferrofluid and a mechanism which generates a magnetic field to shape the ferrofluid. The mechanism may include a magnet which generates a shaped field, a shaped magnet or a shaped magnetically permeable pole piece and a magnet. The ferrofluid is a hydrocarbon-based ferrofluid or another ferrofluid type such as ester, glycol, fluorocarbon, silicone or silahydrocarbon of sufficient magnetization, low viscosity, low surface tension and low volatility so that the ferrofluid forms intricate designs based on the magnetic field used to shape the ferrofluid and the sculpture is stable.

In yet a further embodiment, ferrofluid can be mixed with a solid material that has a low melting point, such as a wax. When the material incorporating the ferrofluid is melted, magnetic sculptures can be formed with the liquid melt using one of the techniques used in the aforementioned embodiments. With the magnetic field present, the material is allowed to solidify, making the magnetic sculpture permanent. The magnet can then be removed.

DETAILED DESCRIPTION OF THE INVENTION

Figure 1:
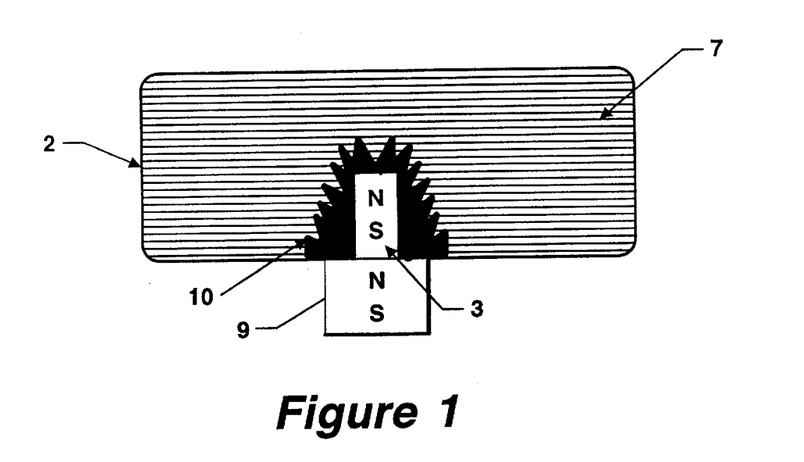
FIG. 1 is a schematic diagram of a ferrofluid sculpting apparatus in accordance with the present invention, including an internal magnet.

As shown in FIG. 1, a hermetically-sealed, tubular housing 2 encloses an axially-polarized permanent magnet 3 and a nonmagnetic liquid 7. Magnet 3 is supported in housing 2 by ferrofluid globule 10 encasing the magnet. A well-known levitation force produced by the ferrofluid 10 keeps the magnet 3 suspended in the ferrofluid so that it slides easily over the inner surface of housing 2. The ferrofluid in globule 10 is held in place over the entire surface area of the magnet 3 by the magnetic field produced by magnet 3. However, housing 2 is large enough so that, as the magnet 3 moves the liquid 7 is free to move around the magnet 3. In general, the housing 2 is filled with liquid 7, but an optional air bubble (not shown) can also be added to allow the contents within housing 2 to thermally expand without breaking the housing.

In order to form a magnetic sculpture, an external magnet 9 can be placed near or against an outer side of housing 2. The magnetic field of the magnet 9 shapes the ferrofluid globule 10 into spikes that follow the field lines. Depending on the relative polarization of the magnet 3 and the magnetic 9, the magnets may either be attracted or repelled, thereby creating different display effects. It is also possible to use a shaped magnetic field generated by replacing magnet 9 with an electromagnetic device that can vary the field force. This allows the globule 10 to be shaped according to the applied field force to produce additional sculptures.

The spikes formed by the ferrofluid are the result of surface tension found within the liquid. This phenomenon occurs at a critical value of magnetic field and the magnetization of the ferrofluid which is dependent upon the values of external magnetic field. The spikes typically are hexagonal in shape and are equidistant from each other.

Because the housing 2 is sealed, there are no evaporative losses from the ferrofluid carrier. In addition, as the magnet 3 moves, there is no residual film of ferrofluid left behind on the surface of the housing 1 from the ferrofluid globule 10. The magnet 3 is permanently suspended by the ferrofluid globule 10 and there is no degradation with time.

The preferred type of carrier liquid used in the ferrofluid in globule 10 is a low molecular weight fluorocarbon liquid, which is chemically known as a perfluoropolyether. This type of ferrofluid has a very low viscosity and produces highly detailed magnetic sculptures. Ferrofluids using a perfluoropolyether carrier liquid are manufactured by Ferrofluidics, Corporation, Nashua, New Hampshire, under the product name EFF1. Fluorocarbon-based ferrofluids, such as the EFF1 ferrofluid, have a relatively high vapor pressure, which means they evaporate quickly when left exposed to room temperature. Accordingly, it is necessary to place the ferrofluid within a container, such as housing 2, to avoid rapid evaporation.

In addition, housing 2 is filled with a nonmagnetic fluid 7 that is immiscible with the ferrofluid in globule 10. The ferrofluid carrier liquid neither mixes nor chemically reacts with the ferrofluid in the globule 10. Thus, the colloidal stability and physical properties of ferrofluid remain unchanged when it is in contact with the liquid 7. The nonmagnetic liquid 7 preferentially wets the inner walls of the housing 2 such that the ferrofluid globule, which would otherwise stick to the dry wall of the housing, now rides on the thin film of the nonmagnetic liquid 7.

Many types of non-magnetic liquids can be used for liquid 7. Water is the preferred liquid, however, because of its high freezing point (0 C), it is preferable to mix the water with any alcohol such as isopropanol, which has a freezing point of −89.5 C. The temperature range of the assembly can thus be extended to lower temperatures.

However, even with the presence of liquid 7, it is important to prevent the perfluoropolyether ferrofluid from wetting the housing walls and smearing, which has been a problem when the ferrofluid and container are used as educational or artistic models or toys. In this case, any type of smearing or agglomeration becomes aesthetically unappealing and distractive. It has been found that when the housing 2 is made of boro-silicate glass, the EFF1 perfluoropolyether ferrofluid does not wet the walls of housing 2. Accordingly, housing 2 may preferably be a quality boro-silicate container such as one provided by Wheaton Corp, of Miliville, N.J., model number 224805, and by Fischer Scientific, of Pittsburgh, Pa., model number 03-338D. Any other boro-silicate container of similar quality would be suitable and can be determined by the skilled artisan without undue experimentation.

Alternately, other types of, or combinations of, ferrofluids and clear liquids may also be used, such as water-based ferrofluid with a low viscosity hydrocarbon oil or a hydrocarbon ferrofluid with water or a water/alcohol mixture as the clear immiscible liquid. For the latter two combinations, the housing can be constructed of suitable plastic materials as the ferrofluid showed no smearing at the container walls.

Figure 2:
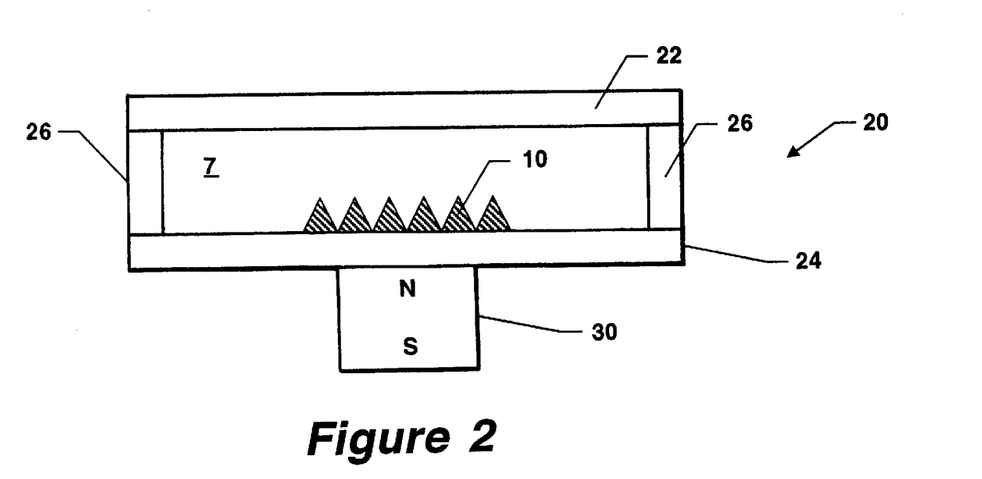
FIG. 2 is a schematic diagram of an alternative ferrofluid sculpting apparatus having a flat rectangular shape and which does not include the magnet inside the ferrofluid.

In another embodiment, as illustrated in the schematic diagram of FIG. 2, a apparatus 20 is depicted that comprises an upper transparent surface 22 spaced apart from a lower surface 24 by a rectangular shaped spacer 26. Disposed within the space defined by surfaces 22 and 24 and spacer 26 is the ferrofluid globule 10 and a transparent, immiscible fluid 7. A magnet 30 provides a magnetic field that causes globule 10 to spike. Such a apparatus 20 would also include a perfluoropolyether ferrofluid and the surfaces 22 and 24 and the frame 26 would be constructed of boro-silicate glass to prevent ferrofluid wetting.

It is also possible to produce magnetic sculptures without using a housing by utilizing a ferrofluid with a low vapor pressure which does not readily evaporate under room temperature conditions. Such ferrofluids generally use a low vapor pressure oil as the carrier liquid. A ferrofluid suitable for this use is sold by the aforementioned Ferrofluidics Corporation under the product name EFH1.

Magnetic sculptures can be formed in several different manners. For example, sculptures can be formed by generating a shaped magnetic field by using specially designed magnets. Alternatively, magnets which produce a simple field can be shaped to generate a fanciful sculpture form. In addition, a specially designed magnetically permeable pole piece can be used which when placed in a magnetic field generated by an ordinary magnet, generates a shaped magnetic field and a resulting ferrofluid art form.

Figure 3:
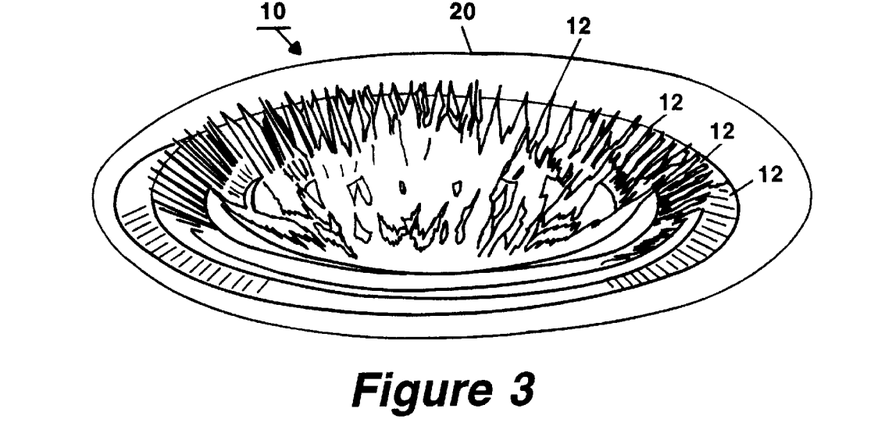
FIG. 3 is a schematic diagram of concentric magnetic field rings formed by the ferrofluid in open air with an oil-based ferrofluid using a specially-designed magnet which generates a shaped field.

FIG. 3 illustrates a fanciful sculpted formation of the ferrofluid 10 produced by a shaped magnetic field generated by a specially-designed magnet. In this arrangement, an oil-based ferrofluid can be placed in a pan or other flat non-magnetic container and spread in a thin circular layer over the bottom of the container. A magnet of sufficient magnetic field strength is placed below the bottom surface 20 of the container in which the ferrofluid is contained. The magnetic field lines are revealed as concentric rings 12 of varying intensities developed by the presence of the magnet field. The center ring has the strongest field effect as illustrated by the sharp spikes. The second inner ring also has a strong field effect so that spikes are formed to correspond to the field lines of the applied magnetic field. Each successive ring is formed by the next outer most field lines generated. The stronger field lines form the sharpest spikes of the ferrofluid. The weaker field lines form less sharp and even dull or non-existent spikes. This illustrates that the field lines are strongest towards the center and dissipate where the fluid is more distant from the magnet itself.

Figure 4:
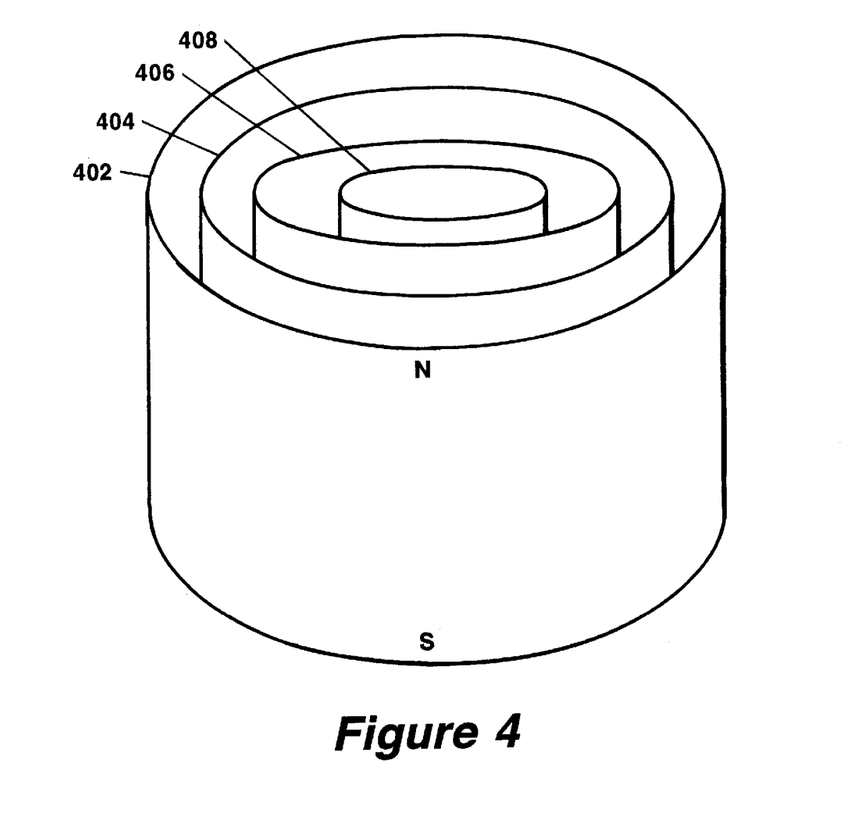
FIG. 4 is the magnet which generates the sculpture illustrated in FIG. 3.

The magnet which generates the magnetic field that produces the magnetic sculpture illustrated in FIG. 3 is shown in FIG. 4. It is an axially polarized magnet consisting of a plurality of concentric poles 402, 404, 406 and 408 on one face.

Figure 5:
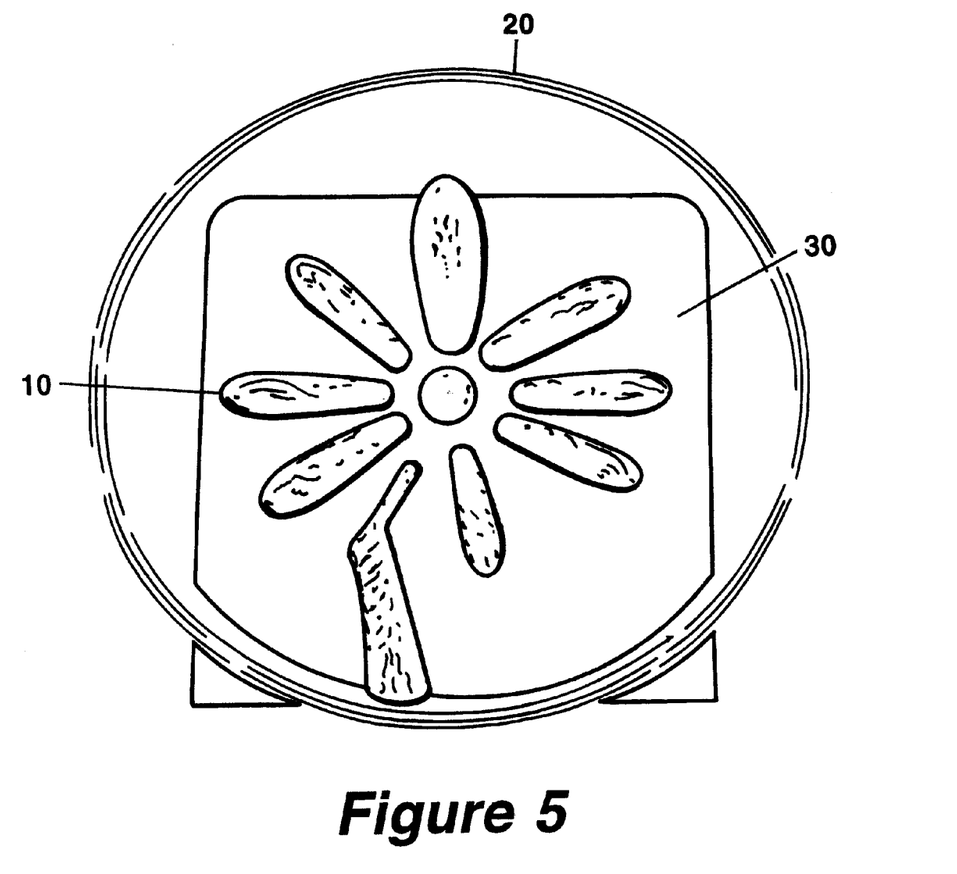
FIG. 5 is a schematic diagram of a ferrofluid sculpture in a floral pattern generated by a shaped magnet.

FIG. 5 illustrates a fanciful sculpture produced by a simple magnet which has been formed in the shape of the desired sculpture. In FIG. 5, a magnet 30 shown in FIG. 6, has a pattern formed in its surface and is placed behind an open pan on which a thin film of ferrofluid has been placed. With magnet 30 behind the pan, the ferrofluid 10 forms a pattern conforming to the pattern made on magnet 30. The magnetic field generated by magnet 30 is strong enough to draw the fluid to the artistic pattern shown. Stronger magnetic fields have the effect of defining the ferrofluid in such a way to illustrate the field lines generated by the magnetic field.

Figure 6:
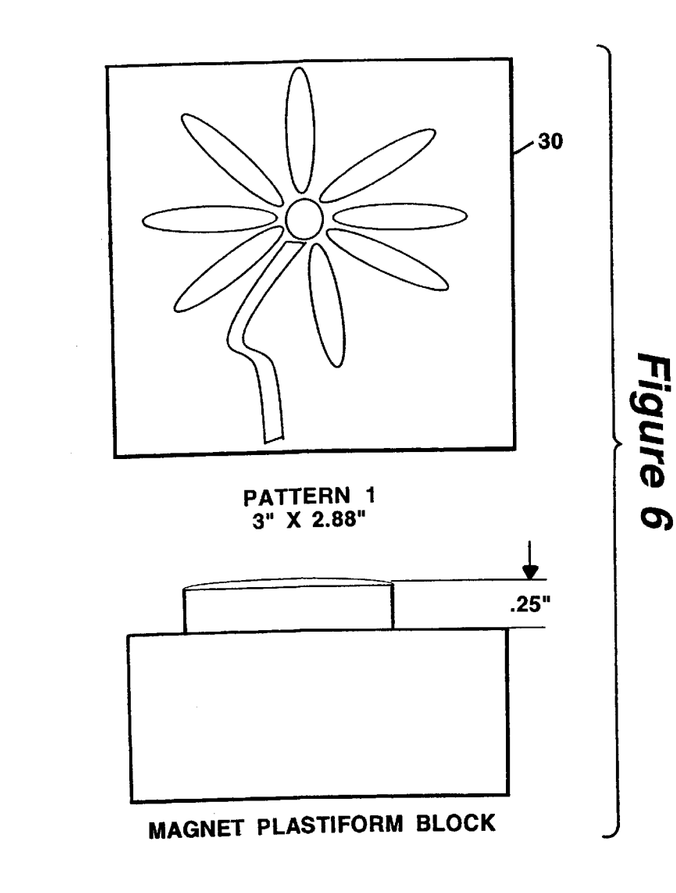
FIG. 6 illustrates a magnet in a floral pattern shape used to generate the sculpture illustrated in FIG. 5.

FIG. 6 depicts a magnet that has a flower pattern formed on the surface. The pattern for magnet 30 generates the sculpture illustrated in FIG. 5. The magnet comprises a magnetic plastiform block 82 which has a raised pattern 80. The pattern 80 is in the form of a bas-relief having a height of about 0.25 inches over the block 82. The floral-type pattern is reproduced by the magnetic ferrofluid in the pan.

The effect is pronounced when ferrofluid is used in combination with an immiscible liquid in a sealed cell as discussed above.

Figure 7:
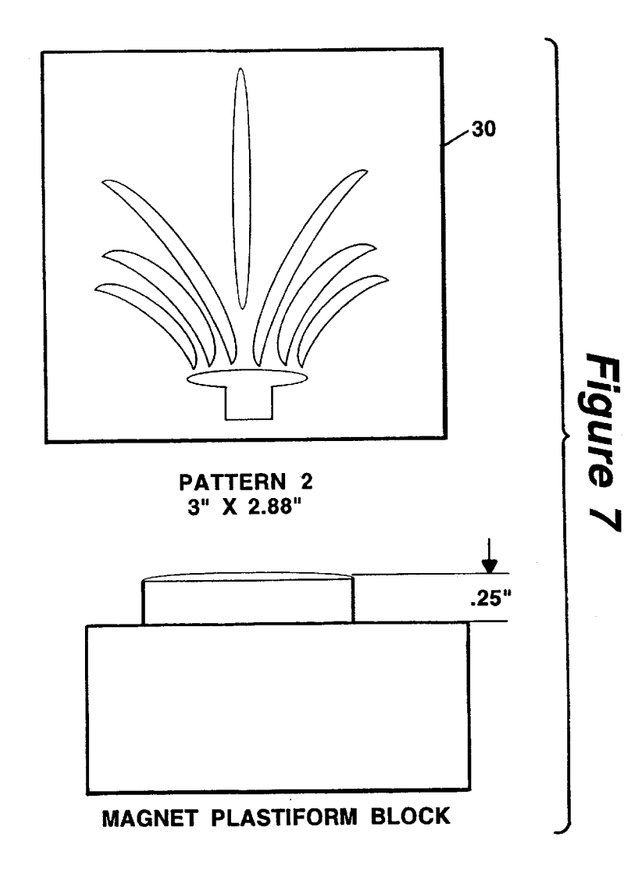
FIG. 7 illustrates a magnet in a fleur-de-lis shape for generating a different magnetic sculpture.

FIG. 7 depicts an alternative artistic pattern, such as a fleur-de-lis, which can be used to generate another magnetic sculpture. Other types of artistic patterns can be formed and these two are merely illustrative of the types of designs possible. These designs can include letters, numbers, animals, dinosaurs, cars, people, etc.

Figure 8:
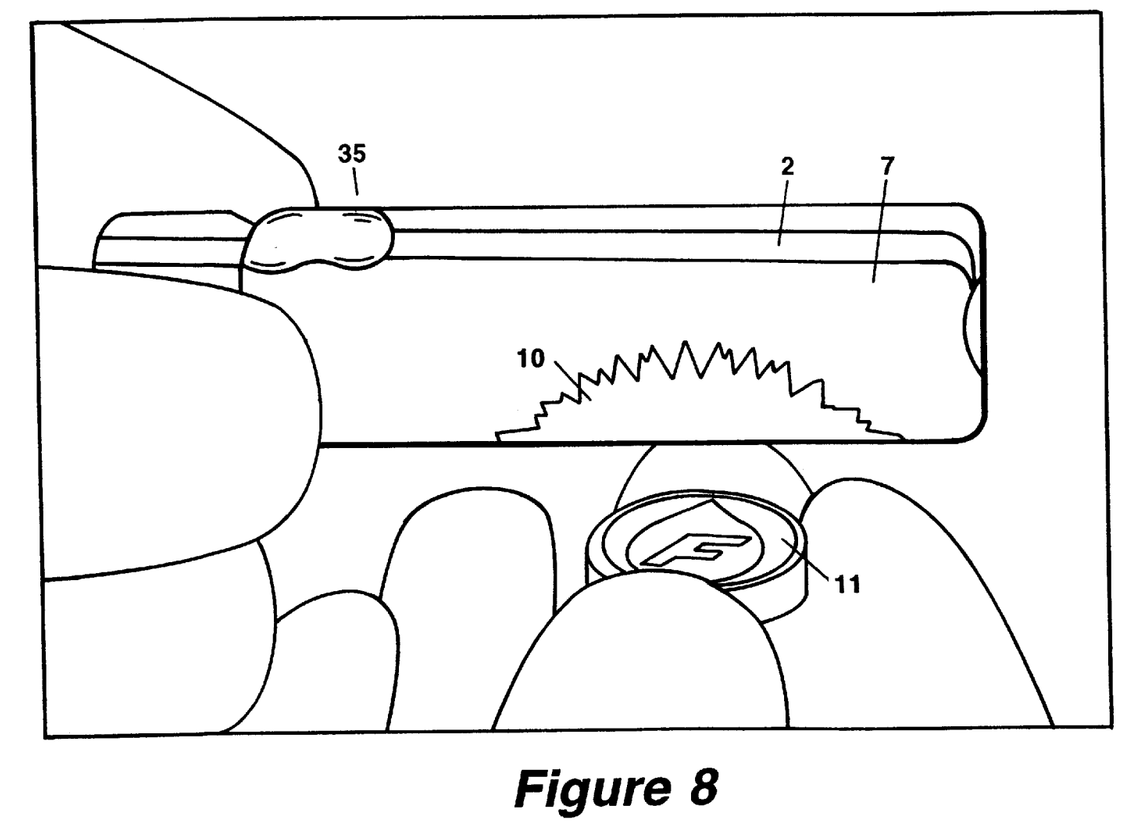
FIG. 8 illustrates a ferrofluid with a fluorocarbon carrier liquid within a sealed container showing the spikes of field lines in accordance with the principles of the present invention.

FIG. 8 depicts a housing 2 such as that represented in FIG. 1. In this case, housing 2 is a boro-silicate glass housing sealed at one end with a cap 34. The housing 2 holds the ferrofluid 10 as well as the nonmagnetic liquid 7, but in this embodiment, no internal magnet is present. An air bubble 35 within the housing 2 allows for expansion and contraction due to pressure or temperature extremes. A biasing magnet 11 is placed below housing 2 and in this illustration, the field lines are depicted by the sharp spikes of the ferrofluid 10 within housing 2.

Figure 9A:
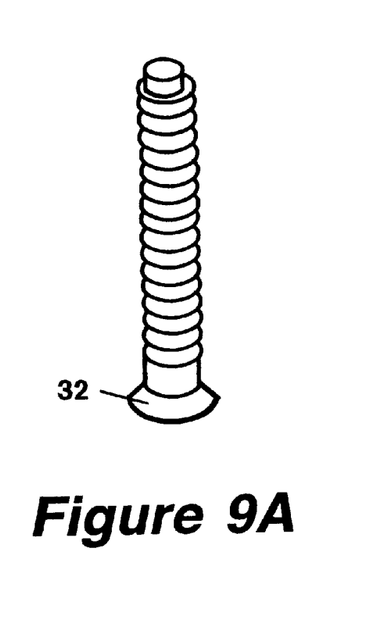
FIG. 9A illustrates a magnetic pole piece used to generate the magnetic sculpture shown in FIG. 9B.
Figure 9B:
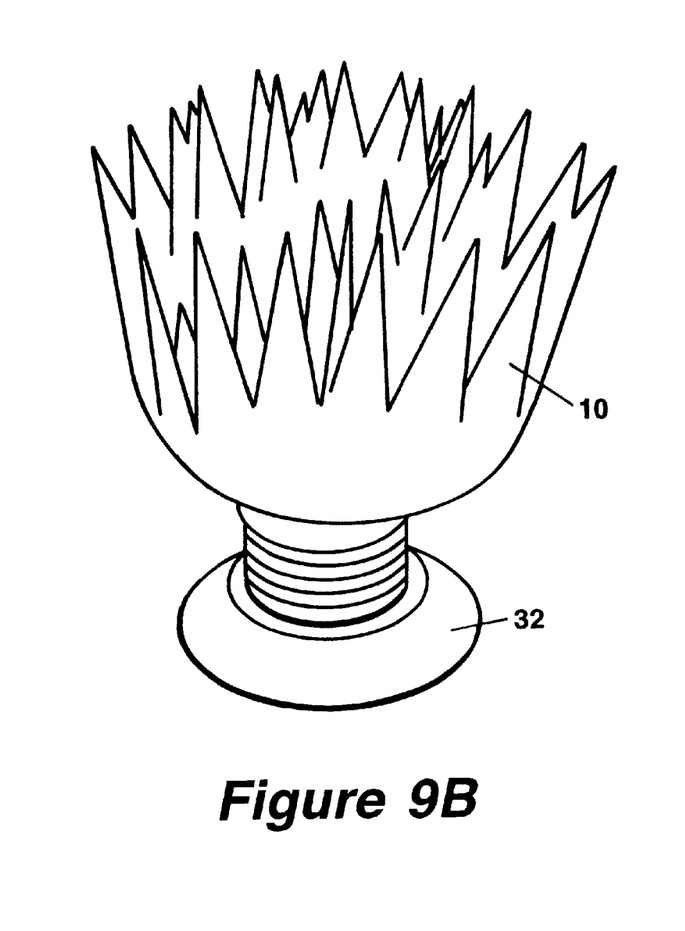
FIG. 9B illustrates a magnetic sculpture formed by the magnetic pole piece illustrated in FIG. 9A.

Magnetic sculptures can also be formed by using magnetically permeable pole pieces constructed of a magnetic material such as iron or steel to generate a shaped magnetic field. When such pole pieces are place in a magnetic field, they, in turn, shape the field and, if ferrofluid is placed on the pole pieces, the shaped field produces fanciful sculptures. FIG. 9A depicts a pole piece 32 in the form of a machine screw. Ferrofluid is applied to the upper end of the pole piece. When this screw and ferrofluid is placed in a magnetic field by, for example, placing the screw on the pole of a magnet, the high magnetic permeability of the pole piece causes the magnetic field to be shaped by pole piece 32. The ferrofluid sculpture illustrated in FIG. 9B is produced by the magnetic field which causes ferrofluid 10 to form spikes in an attempt to follow the magnetic field lines created by the magnet. The spikes 85 are produced when the magnetic field lines are perpendicular to the surface of the ferrofluid. The spiking effect occurs regardless of orientation and is dependent on the magnetization of ferrofluid and the magnetic field strength. Thus, the entire assembly illustrated in FIG. 9B may be inverted with the spikes pointing in a downward direction without altering the shape of the sculpture. When the lines of force from the magnet are parallel to the ferrofluid, no spiking occurs.

Figure 10:
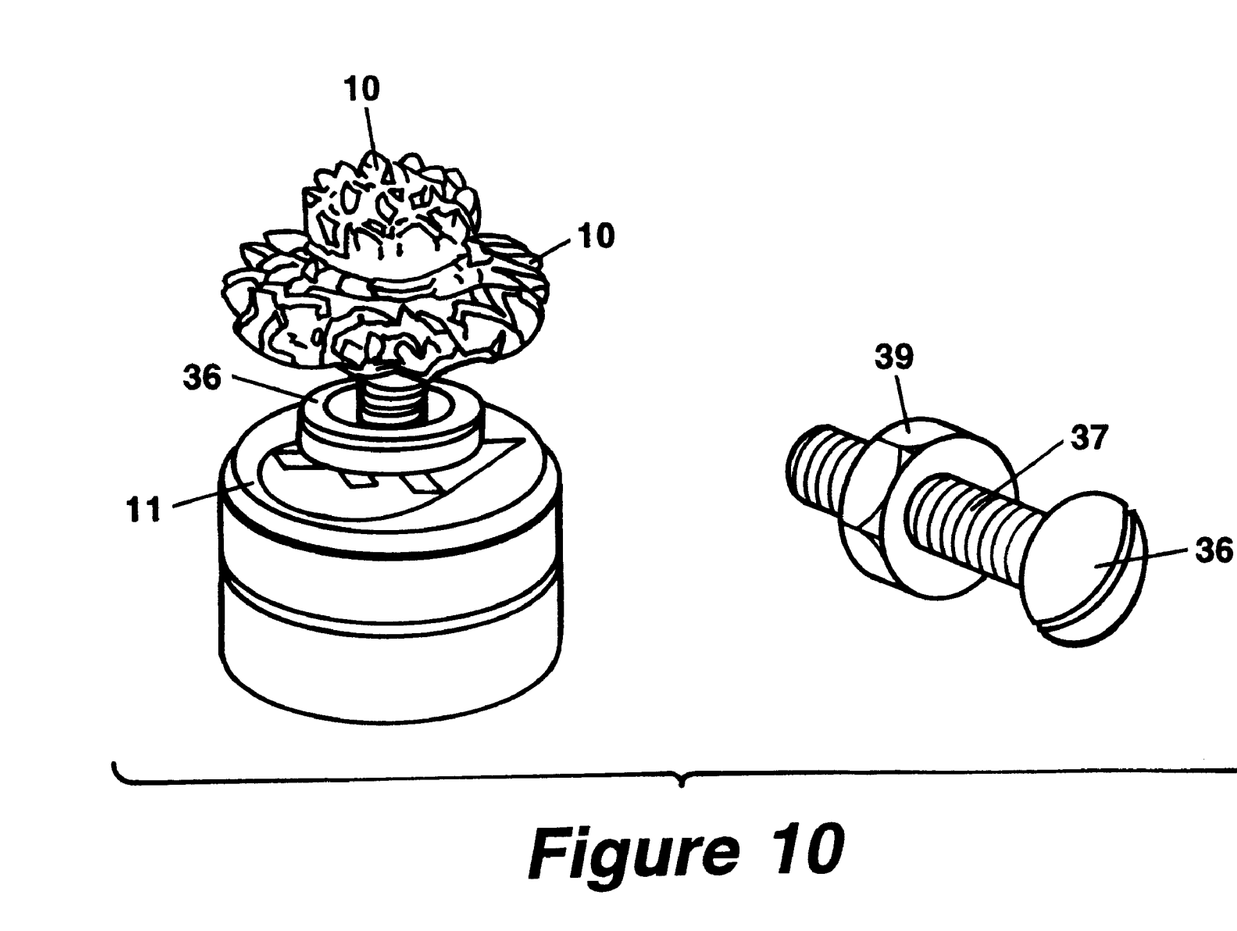
FIG. 10 illustrates another magnetic sculpture design sculpture formed by a magnetic pole piece in a magnetic field.

FIG. 10 depicts another metal pole piece 36 which may illustratively be formed from common objects such as a bolt 37 and nut 39. When this assembly 36 is placed on a magnet 11, another shaped magnetic field is produced. If ferrofluid 10 is applied to the threaded end of bolt 36 and to the nut threaded on the bolt 36, another fanciful magnetic sculpture is produced. The sharp spikes evident in both FIGS. 8 and 9B are less distinct in the sculpture illustrated in FIG. 10 since the magnetic field is split between two ferrofluid paths and is thus reduced in strength. By appropriately varying the form and content of the pole pieces, a large variety of sculptures can be created.

It is also possible to create a magnetic sculpture using a wax ferrofluid. Such a ferrofluid is solid at room temperature but is liquid at an elevated temperature. A wax ferrofluid can easily be produced for example, using a commercial grade heptane or low boiling point hydrocarbon-based-ferrofluid and adding a proper amount of household paraffin wax to the fluid and heating the mixture. Supermarket product Gulf wax used for canning and candle making, for example, melts at 60–70° C. When the mixture is raised above 70° C., the heptane is removed quickly by evaporation and the ferrofluid particles are incorporated into the wax carrier, rendering a wax ferrofluid which is liquid above 75° C. and solid at room temperature.

Sculptures with wax ferrofluid are created the same way as with standard ferrofluid by shaping the magnetic flux lines. Wax ferrofluid is poured (with a syringe or pipette) on to the sculpting apparatus when it is molten. It forms spikes and various other fancy art forms in the molten stage and when the wax solidifies it maintains the shape.

The advantages of wax ferrofluid sculptures are as follows:

(I) The sculpture is permanent with practically infinite life (II) The sculpture is not affected by shock and vibrations and by accidental exposure to magnetic fields (III) The sculpture is easy to handle and ship (IV) The art form can be constructed in layers. Once the first layer of the art form solidifies, a second layer can be added and shaped differently without affecting the first layer.

(V) After the sculpture is made, the wax can be painted in different colors for fanciful effects.

(VI) If an error occurs during the creation of the sculpture, the wax can be melted and the whole process can be repeated.

(VII) The sculpting process is environmentally safe.

(VIII) Localized regions of a wax sculpture can be melted and reshaped without effecting the neighboring pattern.

(IX) The wax sculpture does not require a constant presence of the magnet. Once the sculpture is formed, the magnet can be removed.

(X) In a closed container, a wax sculpture may be surrounded by a colorful liquid such as oil or water to produce a pleasing background.

(XI) Large wax art forms can be created inside bottles with narrow openings, puzzling an observer as to how such shapes were inserted.

(XII) Wax sculptures do not require any special considerations of materials other than the magnetic requirements.

Figure 11A:
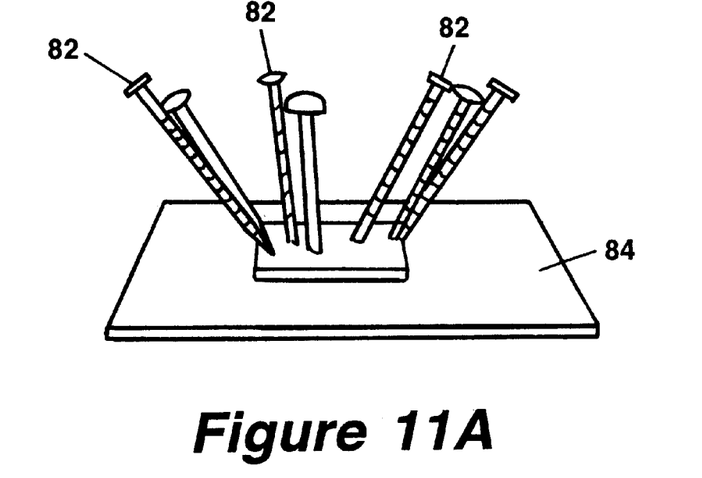
FIG. 11A illustrates a pole piece assembly used to create a permanent magnetic sculpture from a wax and ferrofluid mixture.
Figure 11B:
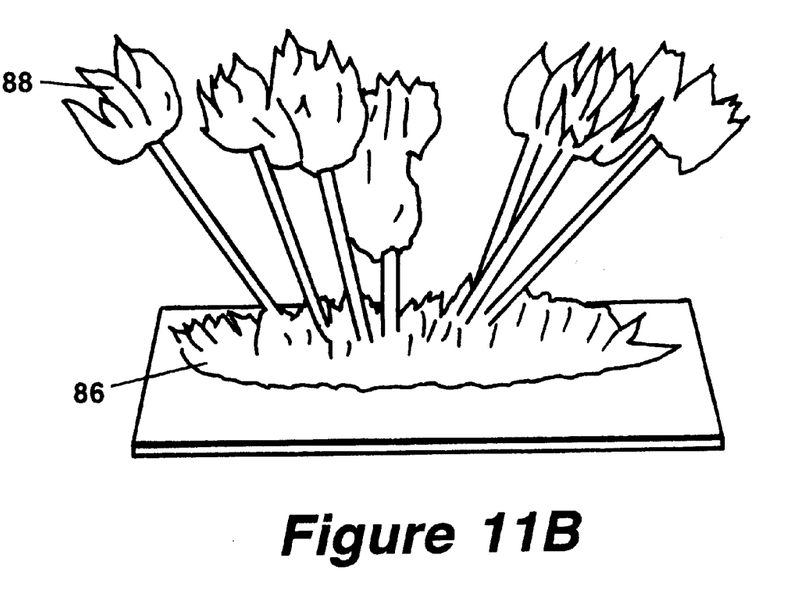
FIG. 11B is a wax/ferrofluid sculpture created from the pole piece illustrated on FIG. 11A.

FIGS. 11A, 11B and 12A and 12B illustrate permanent sculptures formed by means of a wax ferrofluid material. FIG. 11A shows a plurality of pole pieces 82 which may illustratively be nails driven into a supporting bed 84, such a piece of plywood. Melted wax ferrofluid material is applied to the free ends of nails 82 and to the bed and the assembly is placed in a magnetic field. For example, the assembly may be placed on a magnet. The ferrofluid forms sculptures 88 and 86. The wax material is then allowed to harden making the sculptures permanent.

Figure 12A:
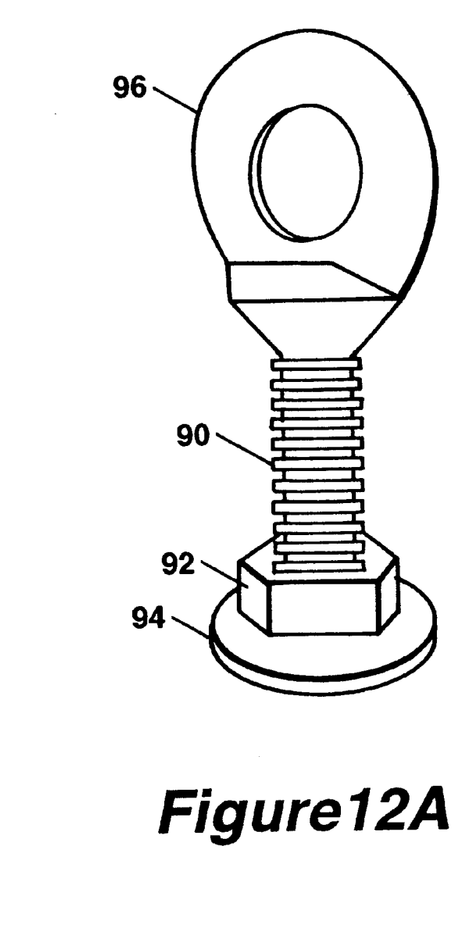
FIG. 12A illustrates a pole piece assembly used to create a alternative permanent magnetic sculpture from a wax and ferrofluid mixture.
Figure 12B:
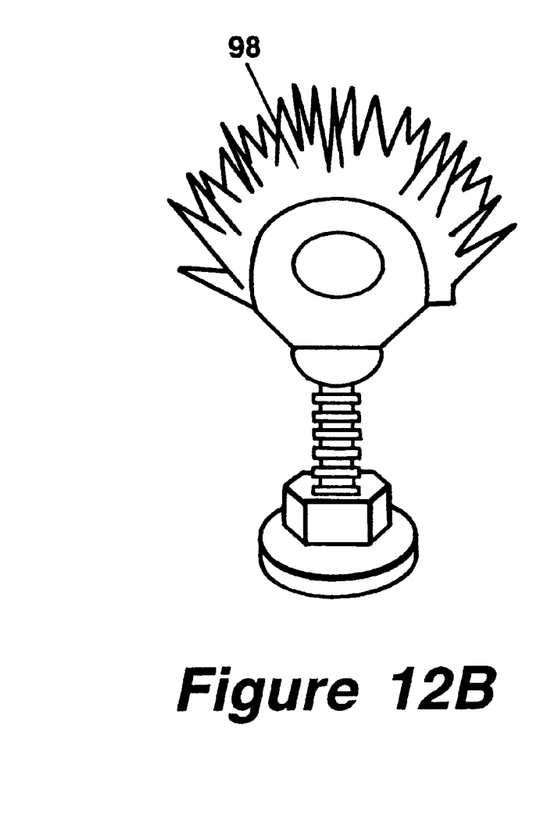
FIG. 12B is a wax/ferrofluid sculpture created from the pole piece illustrated on FIG. 12A.

FIG. 12A shows another pole piece design constructed of a common screw 90, a nut 92 and some washers 94, 96 fastened together. Melted wax ferrofluid material is applied to the top of washer 96 and the assembly is placed in a magnetic field. For example, the assembly may be placed on a magnet. The ferrofluid forms a sculpture 98. The wax material is then allowed to harden making the sculpture permanent.

Ferrofluid 10 is highly responsive to magnetic fields. This responsiveness lends itself to visual demonstrations of magnet fields. Thus, an educational demonstration using ferrofluid contained in a housing such as housing 2 is one application of the present invention. Students may be given their own sample with which to experiment. Since the housing 2 is hermetic, the fluid 10 does not evaporate. The ability to show the effects of the magnetic field lines allows for various types of experiments to be conducted by the student or hobbyist. Air, due to its low magnetic permeability, does not affect the path of the magnetic flux lines. Should a participant place a piece of magnetic material on the top of the magnet to regenerate the spikes, the spikes will either be very small or not be formed at all as the magnetic material will deflect the field lines according the permeability of that magnetic material. The magnetic lines of force follow a path of least reluctance. High permeable materials provide a path of least reluctance for the lines of magnetic force. Air has a permeability of about 1 and is greatly contrasted with a magnetic material such as iron, which has a permeability of about 8,000. The magnetic material placed near a magnetic deflects the magnetic field lines through the material instead of through the low permeable material, such as air.

While the invention has been shown and described above with respect to various preferred embodiments, it will be apparent that the foregoing and other changes of the form and detail may be made therein by one skilled in the art without departing from the spirit and scope of the invention.

For example, although the housing and magnet have been described as having cylindrical shapes, these elements could have shapes with other cross-sections. Further, although it has been described that the magnet is encased in a ferrofluid globule and then placed in an immiscible fluid, the magnet can be encased in the immiscible fluid and the housing filled with the ferrofluid. These and other obvious modifications are intended to be covered by the following claims.

What is claimed is:

1. A method of making a permanent ferrofluid sculpture comprising the steps of:
    (a) melting a wax-based ferrofluid;
    (b) placing the melted ferrofluid in a shaped magnetic field;
    (c) allowing the ferrofluid to harden while remaining within the magnetic field;
    (d) melting a wax-based ferrofluid and placing the melted ferrofluid on the hardened ferrofluid sculpture;
    (e) placing the melted ferrofluid in a shaped magnetic field; and
    (f) allowing the ferrofluid to harden.

2. A method of making a permanent ferrofluid sculpture comprising the steps of:
    (a) melting a wax-based ferrofluid;
    (b) generating a non-uniform magnetic field shaped to interact with the ferrofluid and form the ferrofluid into a fanciful design;
    (c) placing the melted ferrofluid in the shaped magnetic field generated in step (b);
    (d) allowing the ferrofluid to harden while remaining within the shaped magnetic field;
    (e) melting a wax-based ferrofluid and placing the melted ferrofluid on the hardened ferrofluid sculpture;
    (f) placing the melted ferrofluid in a shaped magnetic field; and
    (g) allowing the ferrofluid to harden.

3. A method of making a permanent ferrofluid sculpture according to claim 2 further comprising the steps of:
    (h) selectively melting portions of the permanent ferrofluid sculpture;
    (i) applying a shaped magnetic field to the re-melted portions; and
    (j) allowing the re-melted portions to harden.

4. A method of making a permanent ferrofluid sculpture comprising the steps of:

(a) melting a wax-based ferrofluid;
(b) generating a non-uniform magnetic field shaped to interact with the ferrofluid and form the ferrofluid into a fanciful design having a plurality of spike-shaped protuberances in which the magnetic field lines are clearly visible;
(c) placing the melted ferrofluid in the shaped magnetic field generated in step (b); and
(d) allowing the ferrofluid to harden while remaining within the shaped magnetic field.

* * * * *